US012227011B2

(12) United States Patent
Kudo et al.

(10) Patent No.: US 12,227,011 B2
(45) Date of Patent: Feb. 18, 2025

(54) PRINT MATERIAL STORAGE CONTAINER

(71) Applicant: SEIKO EPSON CORPORATION, Tokyo (JP)

(72) Inventors: Koji Kudo, Shiojiri (JP); Noriyuki Fukasawa, Matsumoto (JP); Hiroyuki Kawate, Hokuto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/402,851

(22) Filed: Jan. 3, 2024

(65) Prior Publication Data

US 2024/0131851 A1 Apr. 25, 2024

Related U.S. Application Data

(63) Continuation of application No. 17/686,473, filed on Mar. 4, 2022, now Pat. No. 11,897,269.

(30) Foreign Application Priority Data

Mar. 5, 2021 (JP) ................................ 2021-035084

(51) Int. Cl.
*B41J 2/175* (2006.01)

(52) U.S. Cl.
CPC ....... *B41J 2/17559* (2013.01); *B41J 2/17513* (2013.01); *B41J 2/17526* (2013.01)

(58) Field of Classification Search
CPC ............... B41J 2/17546; B41J 2/17526; B41J 2/17559; B41J 2/1753; B41J 2/17503
USPC ..................................................... 347/86, 87
See application file for complete search history.

(56) References Cited

U.S. PATENT DOCUMENTS

| | | | |
|---|---|---|---|
| 2002/0122103 A1 | 9/2002 | Yamamoto et al. | |
| 2006/0053030 A1 | 3/2006 | Nakamura et al. | |
| 2017/0182782 A1 | 6/2017 | Lee | |

FOREIGN PATENT DOCUMENTS

| | | | |
|---|---|---|---|
| JP | 2006-082313 A | 3/2006 | |
| JP | 2018-12245 A | 1/2018 | |
| JP | 2018-109732 A | 7/2018 | |
| JP | 3219504 U | 12/2018 | |

*Primary Examiner* — Jason S Uhlenhake
*Assistant Examiner* — Alexander D Shenderov
(74) *Attorney, Agent, or Firm* — Oliff PLC

(57) ABSTRACT

A print material storage container has: a substrate on which an electric circuit having terminals is provided; a fixing portion on which the substrate can be mounted by re-fixing; and a fixing member that fixes the fixing portion and a non-terminal portion, which is formed by excluding the terminals from the substrate, to each other. The non-terminal portion includes a re-fixed portion, which can be re-fixed to the fixing portion by the fixing member.

9 Claims, 10 Drawing Sheets

PRINT MATERIAL STORAGE CONTAINER

This application is a continuation of U.S. application Ser. No. 17/686,473, filed Mar. 4, 2022. The present application is based on, and claims priority from JP Application Serial Number 2021-035084, filed Mar. 5, 2021, the disclosure of which is hereby incorporated by reference herein in its entirety.

BACKGROUND

1. Technical Field

The present disclosure relates to a technology for a print material storage container.

2. Related Art

With a technology known in related art in relation to a liquid cartridge with an integrated circuit (IC) chip fixed to an attachment portion, a blade member is press-fitted to a wall portion, which forms an outer edge of the of the attachment portion, to cut the wall portion and the blade member is then inserted on the same side as the rear side of the IC chip so that the IC chip is taken out in a state in which the IC chip can be reused (see JP-A-2006-82313).

With the technology in related art, after the IC chip is taken out, the liquid cartridge undergoes recycling processing, in which, for example, the liquid cartridge is used as a combustion improver. However, the technology has been problematic in that since part of the attachment portion is cut to take out the IC chip, after the IC chip is taken out, it is difficult to attach the IC chip again to reuse the liquid cartridge. This type of problem is not limited to technologies for liquid cartridges, but is common to print material storage containers that store print materials, such as toner, other than liquids.

SUMMARY

In one aspect of the present disclosure, a print material storage container is provided. This print material storage container has: a substrate on which an electric circuit having terminals is provided; a fixing portion on which the substrate can be mounted by re-fixing; and a fixing member that fixes the fixing portion and a non-terminal portion, which is formed by excluding the terminals from the substrate, to each other. The non-terminal portion includes a re-fixed portion, which can be re-fixed to the fixing portion by the fixing member.

DESCRIPTION OF EXEMPLARY EMBODIMENTS

A. First Embodiment

Figure 1:
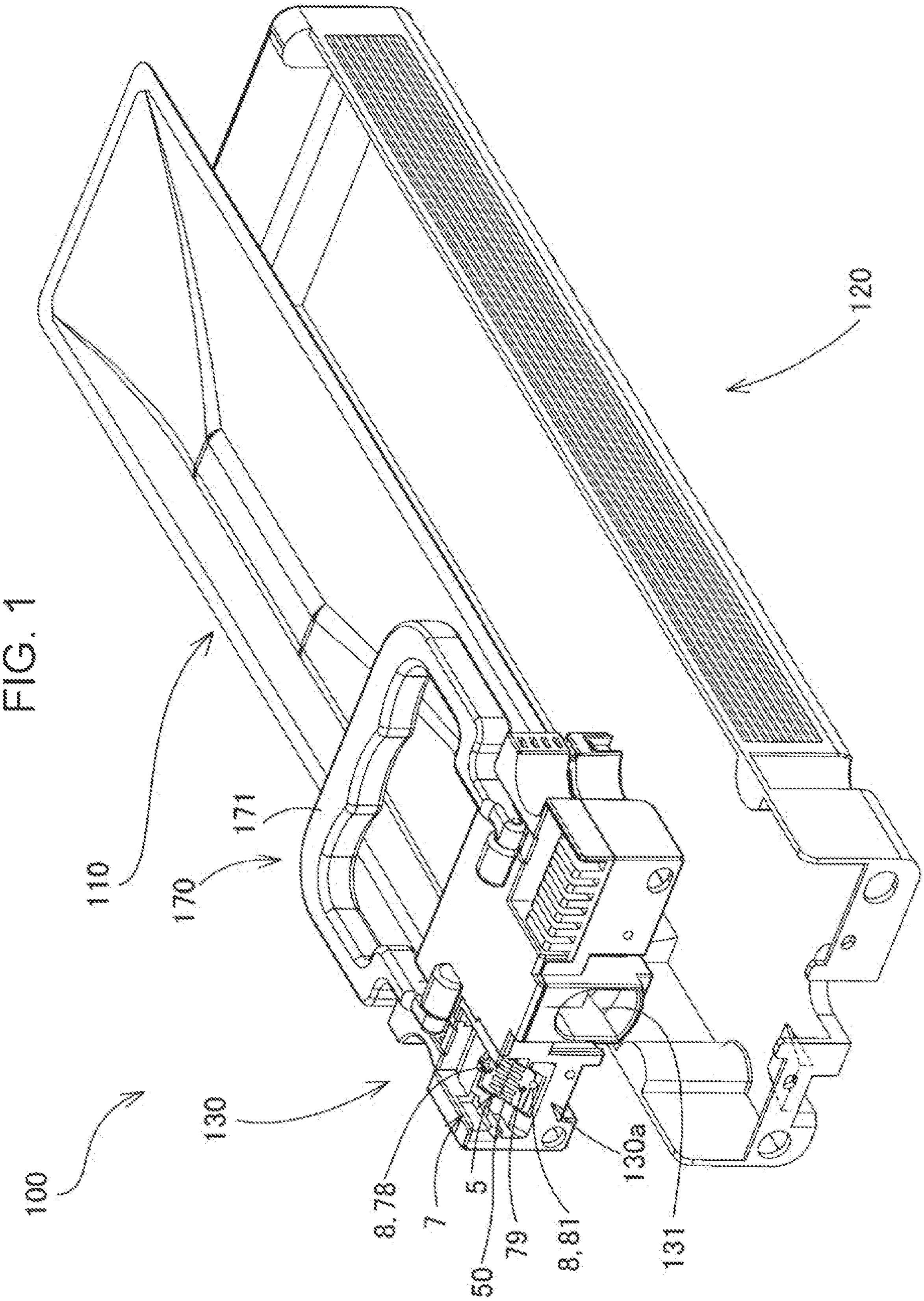
FIG. 1 is a perspective view illustrating the outside shape of a print material storage container.

FIG. 1 is a perspective view illustrating the outside shape of a print material storage container 100. In FIG. 1, a case 120, in which the print material storage container 100 is accommodated, is also illustrated, the case 120 being included in a printing apparatus. The print material storage container 100 supplies a print material to a print head in the printing apparatus (not illustrated). In this embodiment, the printing apparatus is an ink jet printer that discharges ink and the print material storage container 100 is an ink cartridge that stores ink to be used as a print material. In another embodiment, the printing apparatus may be, for example, a printer that uses powder, such as toner, as a print material in printing. In this case, the print material storage container 100 is a toner cartridge that stores powder as a print material. The print material storage container 100 may also be used to collect and store a print material that has been ejected from the printing apparatus but has not been used for printing, instead of being used to store a print material to be supplied to the printing apparatus for printing. For example, the print material storage container 100 may be a drainage tank used to collect ink that has been used in a cleaning operation for the discharge head and has not thereby been used for printing.

The printing apparatus has an apparatus-side mounting section (not illustrated) used to detachably mount the print material storage container 100. The apparatus-side mounting section has the case 120, which can be drawn out. The print material storage container 100 is accommodated in this case 120. When the case 120 with the print material storage container 100 accommodated is pushed into the printing apparatus, the print material storage container 100 is mounted in the printing apparatus.

The print material storage container 100 is reusable. When, for example, the print material in the print material storage container 100 is exhausted or only a small amount of print material remains in it, the print material storage container 100 is removed from the case 120 and is then replenished with the print material, making it possible to reuse the print material storage container 100. In this case, a substrate 5, which will be described later, is removed from the print material storage container 100, and a new substrate 5 is then assembled to the print material storage container 100 to be reused. Alternatively, after substrate 5 has been removed, a memory on it undergoes predetermined processing such as initialization, and the substrate 5 is then assembled to the print material storage container 100 to be reused. In this embodiment, the print material storage container 100 is the one that has been reused.

The print material storage container 100 has a print material storage section 110 and a coupling member 130. The print material storage section 110 stores ink as a print material. The print material storage section 110, which is a so-called ink pack, is formed from a bag-like film having flexibility. However, this is not a limitation on the material and shape of the print material storage section 110. The print material storage section 110 only needs to be capable of storing a print material. When the print material storage container 100 is to be mounted in the printing apparatus, the case 120 is drawn out and the print material storage container 100 is accommodated in it, after which the case 120 is pushed into the printing apparatus. This completes the mounting of the print material storage container 100 in the printing apparatus. A section, in the printing apparatus, that receives the print material storage container 100 mounted in the apparatus-side mounting section will be referred to below as the apparatus-side receiving section. A state in which the print material storage container 100 is mounted in the apparatus-side receiving section in the printing apparatus will be referred to below as the mounted state.

The coupling member 130 is formed from, for example, a resin or the like. The coupling member 130 has a handle 170, a supply port 131, the substrate 5, a fixing portion 7, and fixing members 8.

The handle 170 is grasped when, for example, the print material storage container 100 is to be moved. The handle 170 has a grasp portion 171 grasped by the user. In a state in which the print material storage section 110 is placed in the case 120, the handle 170 is disposed at a position at which the handle 170 is exposed to the outside of the case 120. The handle 170 swings around an axis along a direction perpendicular to the longitudinal direction of the print material storage container 100. Specifically, when the print material storage section 110 is to be attached to or removed from the case 120, the handle 170 changes from a first orientation to a second orientation, in which the handle 170 has been swung. The handle 170 is formed from, for example, a resin such as polypropylene.

The supply port 131 is an opening through which ink is discharged from the print material storage section 110 to the outside. The supply port 131 is formed at the central portion of a side surface **130*a* of the coupling member 130, the side surface 130*a* fitting to an apparatus-side receiving section side (not illustrated). Although not illustrated, the supply port 131 communicates with the print material storage section 110 through a supply port member attached on the same side as the side surface 130*a* of the coupling member 130 and through a tubular member coupled to the supply port member. A supply needle (not illustrated) is provided in the apparatus-side receiving section so as to communicate with the discharge head. When the supply needle is inserted into the supply port 131, ink stored in the print material storage section 110 is supplied to the discharge head side. To prevent the print material from leaking from the print material storage section 110, the supply port 131 is preferably structured so that the supply port 131 remains closed before the supply needle is inserted into the supply port 131 and is opened when the supply needle has been inserted. The supply port 131** has, for example, a seal member, a supply valve that closes an insertion hole in the seal member, and an urging member that urges the supply valve toward the seal member.

The substrate 5 is an electric connecting member on the same side as the print material storage container 100. The substrate 5 electrically connects the print material storage container 100 and printing apparatus to each other in the mounted state described above. Although not illustrated, electric circuits are provided on the substrate 5. The substrate 5 includes terminals 50, which will be described later. Although not illustrated, an apparatus-side electric connecting section is provided in the apparatus-side receiving section in the printing apparatus, the apparatus-side electric connecting section being used for electrical connection to the print material storage container 100. In the mounted state described above, when a contact is made between a terminal 50 on the substrate 5 and a terminal (not illustrated) on the apparatus-side electric connecting section, the printing apparatus and print material storage container 100 are electrically coupled to each other. The terminal, referred to here, on the apparatus-side electric connecting section, is, for example, a conductive elastic member. The coupling member 130 may have a positioning member so as to form a superior coupling between the terminals 50 and the apparatus-side electric connecting section in the mounted state. The positioning member is, for example, a groove, a hole, or a protrusion. When the positioning member fits to a positioning member provided in the apparatus-side receiving section, positioning is eased. The substrate 5 will be described later in detail.

The fixing portion 7 is a portion, of the coupling member 130, that fixes the substrate 5. That is, the fixing portion 7 can be used to mount the substrate 5. The fixing portion 7 is formed as part of the main body of the coupling member 130. In this embodiment, the fixing portion 7 is a recess formed in the main body of the coupling member 130. The bottom surface of the recess is inclined with respect to the mounting direction of the print material storage container 100. However, this is not a limitation on the fixing portion 7. For example, the fixing portion 7 may be a portion perpendicular to or parallel to the mounting direction of the print material storage container 100. The fixing portion 7 will be described later in detail.

The fixing member 8 fixes the fixing portion 7 and a non-terminal portion NT, which is a portion formed by excluding the terminals 50 from the substrate 5, to each other. A rib 78 and a pin 81, which will be described later, are each the fixing member 8. In this embodiment, a fixing member used at an initially-fixed portion 910, which is fixed for the first time, for fixing is referred to as an initial fixing member. A fixing member already used to fix the substrate 5 to the fixing portion 7 before the substrate 5 is re-fixed by the fixing member 8 is referred to as a previously-fixing member. The fixing member 8 will be described later in detail.

Figure 2:
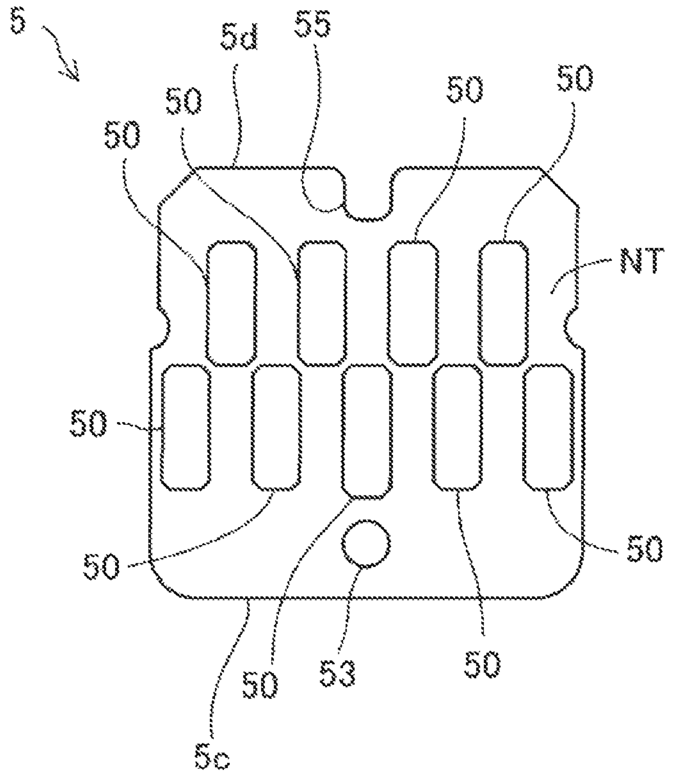
FIG. 2 is a plan view illustrating the front surface of a substrate.

FIG. 2 is a plan view illustrating the front surface **5*a* of the substrate 5. The substrate 5 is in a rectangular shape. The substrate 5 has a plurality of terminals 50 that electrically connect the printing apparatus and the print material storage container 100 to each other, as well as the non-terminal portion NT formed by excluding the terminals 50 from the substrate 5. The terminals 50 are positioned on the front surface 5*a* of the substrate 5 so as to correspond to terminals on the apparatus-side electric connecting section included in the printing apparatus. Each terminal 50 is in a rectangular shape. The terminals 50 are linearly disposed in the upper portion and lower portion of the front surface 5*a* of the substrate 5. Specifically, on the substrate 5, four terminals 50 are disposed in the upper portion and five terminals 50 are disposed in the lower portion. However, this is not a limitation on the number of terminals 50 and their layout. Any number of terminals 50** can be disposed in any layout.

The substrate 5 further has a through-hole 53 and a cutout 55 used for positioning. The through-hole 53 and cutout 55 are formed in the non-terminal portion NT. The through-hole 53 receives a protrusion 79 used as the initial fixing member, which will be described later, formed on the fixing portion 7. The cutout 55 receives the rib 78, which will be described later, disposed on the fixing portion 7. The through-hole 53 is formed so as to be closer to one end 5*c* than is a terminal-formed portion of the substrate 5, the terminals 50 being formed in the terminal-formed portion. The cutout 55 is formed so as to be closer to another end 5*d* than is the terminal-formed portion of the substrate 5. However, this is not a limitation on the positions at which the through-hole 53 and cutout 55 are formed. The through-hole 53 only needs to be at a position at which the through-hole 53 corresponds to the protrusion 79, which will be described later. The cutout 55 only needs to be positioned at a position at which the cutout 55 corresponds to the rib 78, which will be described later. An aspect in which the protrusion 79 and the through-hole 53 are fitted to each other and an aspect in which the rib 78 and the cutout 55 are fitted to each other will be described later.

Figure 3:
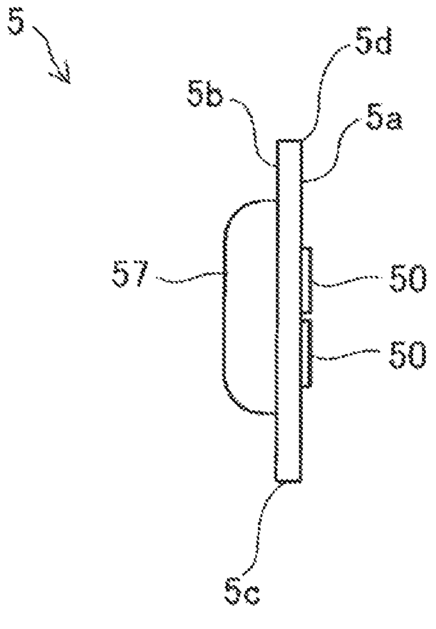
FIG. 3 illustrates a side surface of the substrate.

FIG. 3 illustrates a side surface of the substrate 5. A storage device 57 is provided on the rear surface 5*b* of the substrate 5. The storage device 57 is electrically coupled to the terminals 50 through wires (not illustrated). The storage device 57 stores information about the print material and the like. Information about the print material includes, for example, the manufacturing date of the print material storage container 100 and its useful service life, as well as the type and color tone of the print material stored in the print material storage container 100. The storage device 57 receives and transmits various types of information and transmits information between the storage device 57 and a recording material discharge apparatus through a plurality of terminals 50. The storage device 57 disposed on the rear surface 5*b* of the substrate 5 is not a prerequisite. A circuit that detects the electric connecting of the apparatus-side electric connecting section, for example, may be provided on the rear surface 5*b*.

Figure 4:
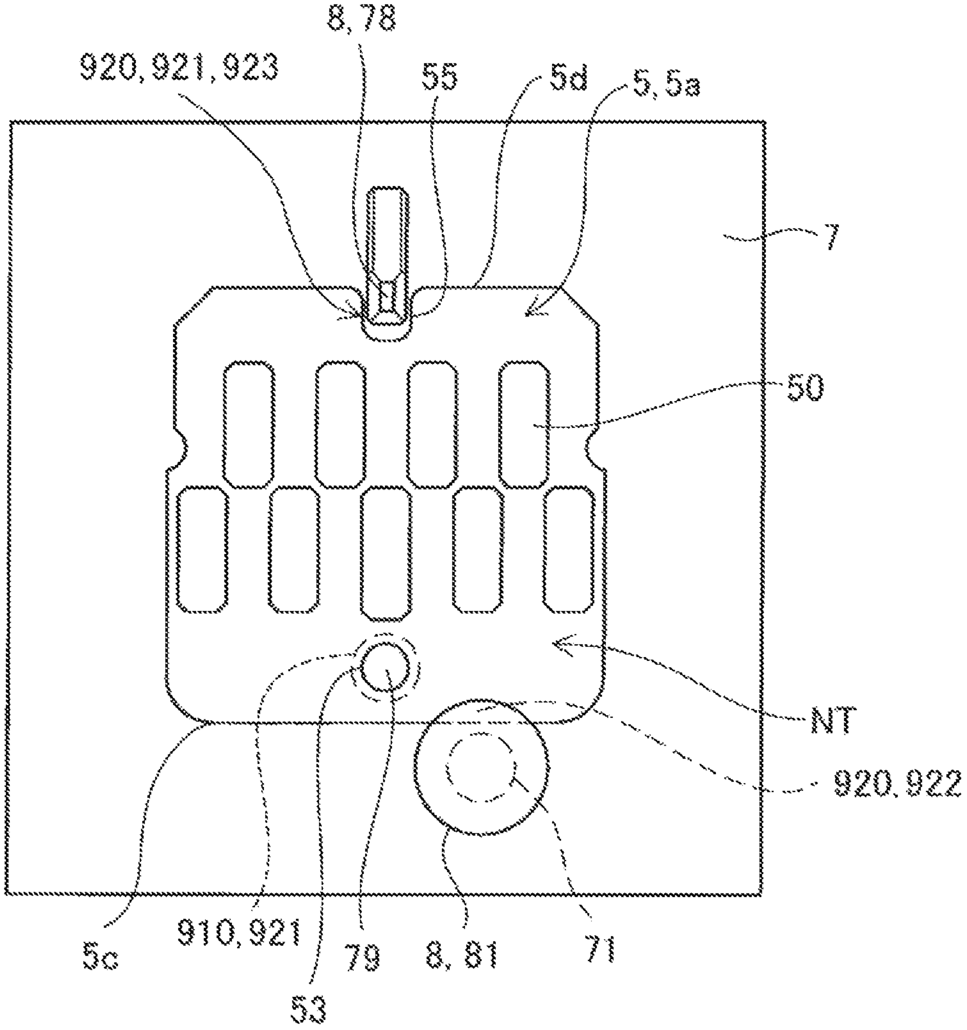
FIG. 4 is a top view illustrating a state in which, in a first embodiment, the substrate is attached to a fixing portion.
Figure 5:
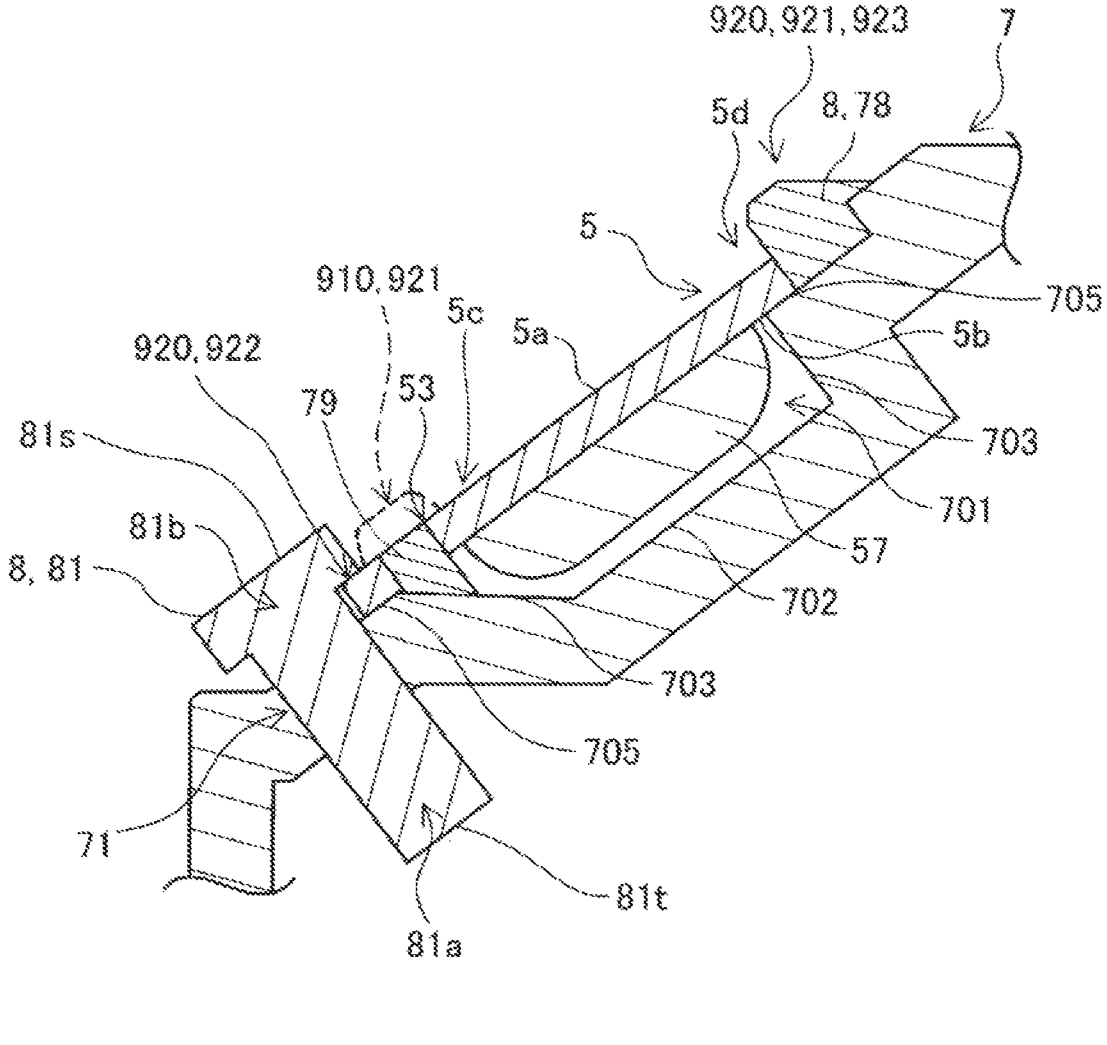
FIG. 5 schematically illustrates a cross section in a state in which the substrate is attached to the fixing portion.

FIG. 4 is a top view illustrating a state in which, in the first embodiment, the substrate 5 is attached to the fixing portion 7. FIG. 5 schematically illustrates a cross section in a state in which, in the first embodiment, the substrate 5 is attached to the fixing portion 7. Although FIGS. 4 and 5 illustrate an aspect in re-fixing, which will be described later, the constituent elements and their positions in the aspect are the same as in the description below. Therefore, these drawings will be referenced in the description below.

As illustrated in FIG. 5, the fixing portion 7 has a depression 701, in which the substrate 5 is accommodated, an abutting portion 705 in contact with the one end 5*c* and other end 5*d* of the rear surface 5*b* of the substrate 5, the rib 78, and the protrusion 79. The depression 701 is formed by a bottom 702 facing the storage device 57 and a wall 703 forming the inner wall of the depression 701. The rib 78 and protrusion 79 each function as the previously-fixing member, which has already been used to fix the substrate 5 to the fixing portion 7 before the substrate 5 is re-fixed by the fixing member 8 (the fixing member 8 will be described later).

The rib 78 is used for the positioning of the substrate 5. Specifically, the substrate 5 is slid in the cutout 55 formed in the substrate 5 in a direction from the one end 5*c* of the substrate 5 toward the other end 5*d* so that cutout 55 and rib 78 are fitted to each other. Then, the substrate 5 is positioned. The rib 78 in this embodiment, which is in a polyhedral shape, protrudes from the upper surface side of the cutout 55, that is, the front surface 5*a* of the substrate 5, in a state in which the rib 78 is fitted to the cutout 55. However, this is not a limitation on the position and shape of the rib 78. The rib 78 only needs to be shaped and positioned so as to correspond to the cutout 55. For example, the rib 78 may be in a columnar shape.

The protrusion 79 is a member provided so as to erect from the wall 703. When the protrusion 79 is inserted into the through-hole 53 formed in the substrate 5, the substrate 5 is positioned. As described above, the protrusion 79 functions as the previously-fixing member. The protrusion 79 also functions as the initial fixing member that initially fixes the substrate 5 to the fixing portion 7. That is, the protrusion 79 doubles as the previously-fixing member and initial fixing member. In this embodiment, the protrusion 79 is in a columnar shape. With the protrusion 79 inserted into the through-hole 53 in the initial fixing, the protrusion 79 is in a state in which the protrusion 79 protrudes from the upper surface side of the through-hole 53, that is, the front surface 5*a* of the substrate 5. However, this is not a limitation on the position and shape of the protrusion 79. The shape and position of the protrusion 79 only need to be shaped and positioned so as to correspond to the through-hole 53.

The rib 78 and protrusion 79 are each a member that can be deformed when heated and pressurized. They are formed from a material similar to the material of the coupling member 130. In the initial fixing of the substrate 5 to the fixing portion 7 in this embodiment, the top of the protrusion 79 protruding from the through-hole 53 is thermally crimped. Specifically, in a state in which the rib 78 is fitted to the cutout 55 and the protrusion 79 is inserted into the through-hole 53, that is, in a state in which the substrate 5 is mounted on the fixing portion 7, the top of the protrusion 79 is softened by heat and is then pressed toward the substrate 5. Then, the substrate 5 is fixed to the fixing portion 7. In the description below, the through-hole 53 formed in the substrate 5 and the periphery of the through-hole 53 will be referred to as an initially-fixed portion 910. That is, the initially-fixed portion 910 includes the protrusion 79 that has been thermally crimped. When the substrate 5 is to be re-fixed to the fixing portion 7, the initially-fixed portion 910 has been shaved. In FIGS. 4 and 5, therefore, the initially-fixed portion 910 is illustrated by a dashed line. To have the protrusion 79 fix the substrate 5 to the fixing portion 7, the top of the protrusion 79 may be pressurized so as to be crushed and deformed. However, this embodiment is not limited to the above description. For example, the protrusion 79 may be used only for positioning by being inserted into the through-hole 53. Fixing by heat and pressure may be omitted.

Similarly, in this embodiment, in the initial fixing of the substrate 5 to the fixing portion 7 in the print material storage container 100, the top of the rib 78 fitted to the cutout 55 is thermally crimped. In this case, to have the rib 78 fix the substrate 5 to the fixing portion 7, the top of the rib 78 may be crushed and deformed by pressure. When the substrate 5 is to be re-fixed to the fixing portion 7, at least part of the portion, deformed by thermal crimping, of the rib 78 has been cut. However, this embodiment is not limited to the above description. For example, the rib 78 may be used only for positioning by being fitted to the cutout 55. Fixing by heat and pressure may be omitted.

Next, an aspect will be described in which after having been initially fixed, the substrate 5 is removed from the fixing portion 7. First, on the same side as the one end 5*c* of the substrate 5, the substrate 5 can be removed from the fixing portion 7 by removing the thermally crimped portion of the protrusion 79 at the initially-fixed portion 910. The thermally crimped portion can be removed by, for example, cutting or shaving. Thus, both the substrate 5 and the fixing portion 7 can be reused in re-fixing, which will be described later.

On the same side as the other end 5*d* of the substrate 5, the rib 78 is removed from the cutout 55 by sliding the substrate 5 in a direction from the other end 5*d* of the substrate 5 toward the one end 5*c*. Thus, both the substrate 5 and the fixing portion 7 can be reused in re-fixing, which will be described later. After the rib 78 has been thermally crimped, when part of the rib 78 is fused and adheres to the front surface 5*a* of the substrate 5, it is only necessary to remove the fused portion by, for example, cutting or scraping, as in the case of the protrusion 79.

Next, an aspect will be described in which the substrate 5 is re-fixed to the fixing portion 7.

As for the print material storage container 100, the substrate 5 and fixing portion 7 can be reused as described above. That is, the substrate 5 includes a re-fixed portion 920, which can be re-fixed by the fixing member 8, as illustrated in FIG. 4. The re-fixed portion 920 referred to here includes, in the non-terminal portion NT, an unused portion 922 different from a previously-fixed portion 921, which has already been used to fix the substrate 5 to the fixing portion 7. In this embodiment, the previously-fixed portion 921 is composed of the periphery of the cutout 55 and the periphery of the through-hole 53, the periphery being part of the initially-fixed portion 910. The re-fixed portion 920 also includes a to-be-reused portion 923, which can be reused by removing at least part of the rib 78, which is the previously-fixing member already used for fixing. The fixing member 8 may be formed integrally as part of the fixing portion 7 as with the rib 78 and protrusion 79, or may be formed separately from the fixing portion 7 as with the pin 81.

With the print material storage container 100, any one of the targets in re-fixing may be unused, that is, may be the substrate 5 or fixing portion 7 that is used for the first time. For example, a combination of the targets in re-fixing may be a combination of the unused substrate 5 and the fixing portion 7 that has become reusable or a combination of the substrate 5 that has become reusable and the unused fixing portion 7. In addition, the substrate 5 that has become reusable and the fixing portion 7 that has become reusable may be used in re-fixing. When the unused substrate 5 or unused fixing portion 7 is to be used in re-fixing, it is preferable to remove the previously-fixed portion 921 in advance. For example, it is preferable to remove the protrusion 79 provided on the fixing portion 7 in advance to prevent part or the like of the remaining protrusion 79 from impairing re-fixing. A fixing hole 71, which will be described later, may be formed in the unused fixing portion 7 in advance.

In FIGS. 4 and 5, the substrate 5 is re-fixed to the fixing portion 7 by using the pin 81 and rib 78, which are each the fixing member 8, as an example. The pin 81 is formed from, for example, a resin or a metal such as iron. The pin 81 re-fixes the unused portion 922 of the terminal 50. The rib 78 re-fixes the to-be-reused portion 923 of the terminal 50.

The to-be-reused portion 923 is re-fixed as described below. First, the substrate 5 is slid in the direction from the one end 5*c* of the substrate 5 toward the other end 5*d* with respect to the rib 78 on the fixing portion 7 so that the rib 78 and the cutout 55 in the substrate 5 are fitted to each other. Thus, the substrate 5 is positioned. Next, with the rib 78 fitted to the cutout 55, the top of the rib 78 is deformed by, for example, thermal crimping. Thus, on the same side as the one end 5*c*, the substrate 5 is fixed to the fixing portion 7. When thermal crimping or the like has been performed in initial fixing and the top of the rib 78 provided on the fixing portion 7 has thereby been deformed, the top of the deformed rib 78 can prevent the substrate 5 from being raised. In this case, therefore, fixing by thermal crimping or the like does not need to be performed again.

Next, the substrate 5 is re-fixed at the unused portion 922 on the substrate 5. The fixing portion 7 further has the above-mentioned fixing hole 71, into which the pin 81, which is the fixing member 8, is inserted, as illustrated in FIG. 5. In the fixing portion 7, the fixing hole 71 is formed in the periphery of the substrate 5. The pin 81 has an shaft 81*a* inserted into the fixing hole 71 in the fixing portion 7 as well as a vertex 81*b* provided on the same side as the base end 81*s* of the shaft 81*a*. The vertex 81*b* fixes the non-terminal portion NT on the substrate 5 to the fixing portion 7. The shaft 81*a* of the pin 81 is formed so as to be inserted into the fixing hole 71. The vertex 81*b* is formed so that its outside shape is larger than the fixing hole 71 in size. Thus, with the substrate 5 mounted on the fixing portion 7, when the shaft 81*a* of the pin 81 is inserted into the fixing hole 71 from above the substrate 5 and the pin 81 is then pressed downward, the vertex 81*b* of the pin 81 comes into contact with the front surface 5*a* of the substrate 5. On the same side as the one end 5*c*, therefore, the substrate 5 is re-fixed to the fixing portion 7 by the pin 81, which is the fixing member 8. However, this is not a limitation on the shapes of the pin 81 and fixing hole 71. For example, they may have shapes such as the shapes of a bolt and a nut.

The substrate 5 in the present disclosure has the protrusion 79 on the same side as the one end 5*c* of the substrate 5. In the initial fixing, the protrusion 79 is fixed by thermal crimping as part of the initially-fixed portion 910. The protrusion 79 included in the initially-fixed portion 910 is damaged by, for example, being cut so as to be removed. In later re-fixing, this makes it impossible to use the protrusion 79 in positioning or as part of the re-fixed portion 920. Therefore, the re-fixed portion 920 is preferably disposed on the same side as the one end 5*c*, of the substrate 5, at which the initially-fixed portion 910 in the unused portion 922 is positioned. This assures superior positioning and re-fixing on the same side as the one end 5*c* of the substrate 5. However, it is not a necessity to dispose the re-fixed portion 920 on the same side as the one end 5*c* of the substrate 5, the initially-fixed portion 910 being positioned on the same side.

Here, an aspect in which the substrate 5 that has been re-fixed is removed from the fixing portion 7 will be described. Further re-fixing between the substrate 5 and the fixing portion 7 will also be described.

First, the pin 81 that has been inserted in re-fixing is pulled upward to take out it from the fixing hole 71. Then, the one end 5*c* of the substrate 5 can be removed from the fixing portion 7. In this case, on the same side as the one end 5*c* of the substrate 5, it is only necessary to fix the to-be-reused portion 923, which becomes reusable in further re-fixing by removing the pin 81, which is the fixing member 8. On the same side as the other end 5*d* of the substrate 5, when the substrate 5 is slid in the direction from the other end 5*d* of the substrate 5 toward the one end 5*c*, the rib 78 can be removed from the cutout 55, as described above. This enables both the substrate 5 and the fixing portion 7 to be repeatedly reused in further re-fixing. When the rib 78 has been thermally crimped on the same side as the other end 5*d* of the substrate 5, the thermally crimped portion may be removed by, for example, cutting it off.

In the above embodiment, when the pin 81, which is the fixing member 8, is replaced, the substrate 5 can be repeatedly attached to and removed from the fixing portion 7 without the fixing portion 7 being damaged. That is, the substrate 5 has the re-fixed portion 920. When the substrate 5 is re-fixed to the fixing portion 7 by the fixing member 8, therefore, the print material storage container 100 can be reused. This can reduce an environmental load.

In the above embodiment, the fixing member 8 can be used in re-fixing without being damaged, as in the case of the rib 78 and pin 81. Furthermore, in the above embodiment, the substrate 5 and fixing portion 7 each have a common structure before and after re-fixing, so the substrate 5 can be easily positioned. This can reduce the possibility that electrical coupling is not established between a terminal 50 on the substrate 5 and a terminal on the apparatus-side electric connecting section.

When a fixing portion is a separate body that is detachably attached to the print material storage container 100, a portion used to fix the fixing portion needs to be provided in the print material storage container 100. However, the fixing portion 7 in the above embodiment is formed integrally with the coupling member 130 as part of the print material storage container 100. This eliminates the need to reserve, in the print material storage container 100, a space in which to attach the separate fixing portion. Accordingly, an amount by which the print material is stored in the print material storage section 110 can be increased. Alternatively, the print material storage container 100 can be made compact.

B. Second Embodiment

Figure 6:
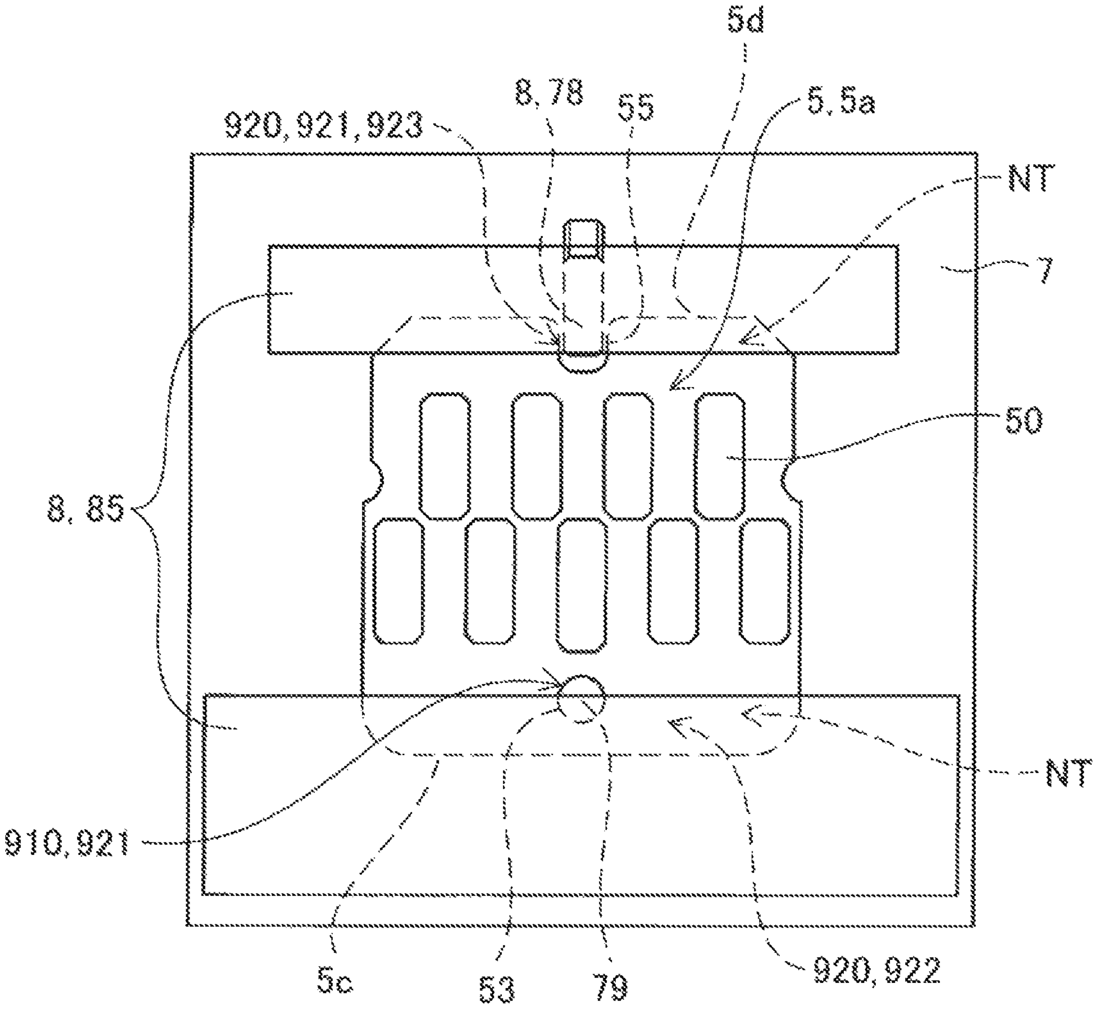
FIG. 6 is a top view illustrating a state in which, in a second embodiment, the substrate is attached to the fixing portion.
Figure 7:
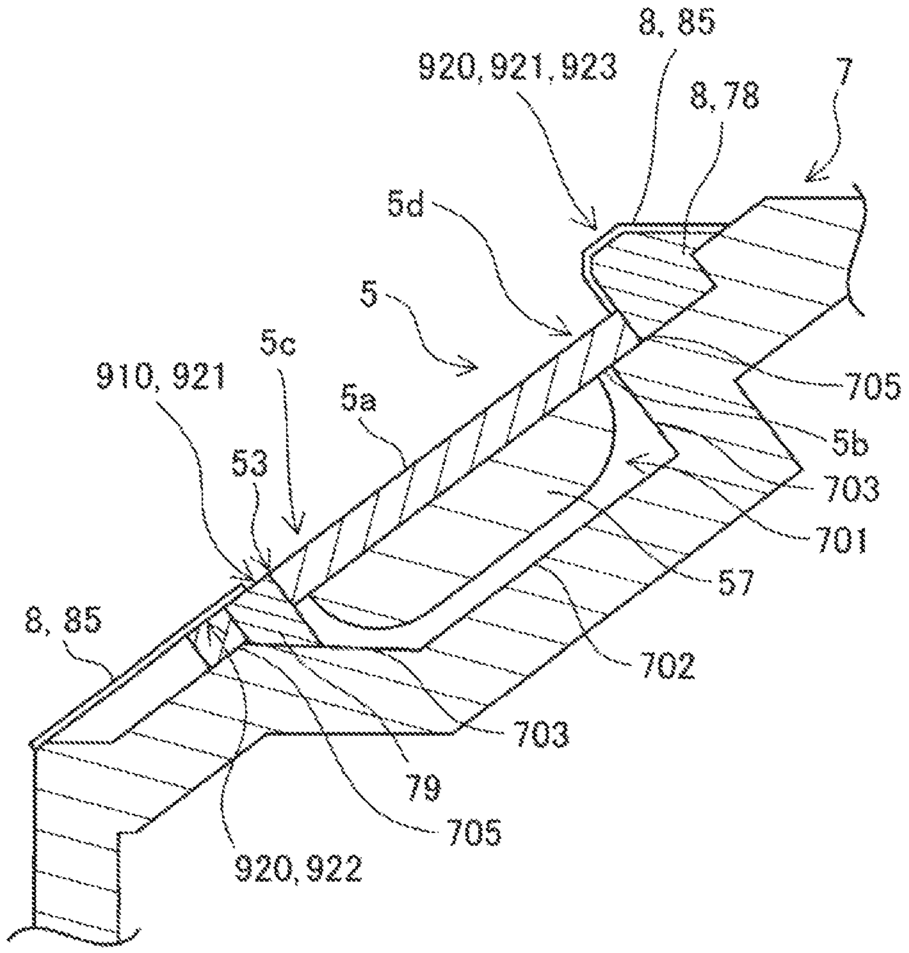
FIG. 7 schematically illustrates a cross section in a state in which the substrate is attached to the fixing portion.

FIG. 6 is a top view illustrating a state in which, in a second embodiment, the substrate 5 is attached to the fixing portion 7. FIG. 7 schematically illustrates a cross section in a state in which, in the second embodiment, the substrate 5 is attached to the fixing portion 7. In FIGS. 6 and 7, as an example, the substrate 5 is re-fixed to the fixing portion 7 by using a film member 85 as the fixing member 8. The film member 85 is formed from, for example, a resin. The film member 85 is welded by heat and pressure or is bonded. In this embodiment, on the same side as the other end 5*d* of the substrate 5, the to-be-reused portion 923, which can be re-fixed as the result of removing the rib 78 used as the previously-fixing member, is re-fixed. On the same side as the one end 5*c* of the substrate 5, the unused portion 922 different from the previously-fixed portion 921 is re-fixed. Re-fixing and positioning on the same side as the other end 5*d* of the substrate 5 are performed as in the first embodiment described above, so descriptions will be omitted.

An aspect of re-fixing on the same side as the one end 5*c* of the substrate 5 in this embodiment will be described below. On the same side as the other end 5*d* of the substrate 5, the cutout 55 and rib 78 are fitted to each other, that is, the substrate 5 is positioned. The non-terminal portion NT on the same side as the one end 5*c* of the substrate 5 and the periphery of the fixing portion 7 on the same side as the one end 5*c* of the substrate 5 are covered by the film member 85 from the same side as the front surface 5*a* of the substrate 5. Similarly, the non-terminal portion NT on the same side as the other end 5*d* of the substrate 5 and the periphery of the fixing portion 7 on the same side as the other end 5*d* of the substrate 5 are covered by the film member 85 from the same side as the front surface 5*a* of the substrate 5. In this case, on the same side as the other end 5*d* of the substrate 5, it is only necessary to mount the film member 85 so as to cover the periphery of the fixing portion 7 from above the rib 78. In this state, the fixing portion 7 and the same side as the front surface 5*a* of the substrate 5 are thermally fused together by, for example, heat-sealing. Specifically, the fixing portion 7 and the same side as the front surface 5*a* of the substrate 5, the film member 85 being mounted on the front surface 5*a*, are heated, after which pressure is applied through the film member 85 so that the film member 85 is welded on the substrate 5 and fixing portion 7. Thus, the substrate 5 is re-fixed to the fixing portion 7 by the film member 85 used as the fixing member 8. Part or the whole of the film member 85 may be thermally fused by, for example, heat-sealing. The range of the film member 85 in which to perform thermal fusing only needs to be enough to re-fix the substrate 5 and fixing portion 7 to each other.

Now, an aspect in which the substrate 5 re-fixed in this embodiment is removed from the fixing portion 7 will be described together with further re-fixing between the substrate 5 and the fixing portion 7.

First, the film member 85 is removed by cutting or scraping. In the removal of the film member 85, it is only necessary to cut the film member 85 that has been thermally fused, along the borders of the substrate 5 on the fixing portion 7. That is, after the film member 85 has been removed, the film member 85 that has been thermally fused may remain on the non-terminal portion NT and fixing portion 7. Then, the rib 78 fitted to the cutout 55 is removed. The rib 78 may be removed by being damaged or by sliding the substrate 5 in the direction from the other end 5*d* of the substrate 5 toward the one end 5*c*. Thus, the substrate 5 is removed from the fixing portion 7. In this case, at least one of the to-be-reused portion 923 and unused portion 922 can be used in further re-fixing. The to-be-reused portion 923 can be used in further re-fixing as a result of removing the film member 85 used as the fixing member 8. The unused portion 922 is a portion different from the previously-fixed portion 921 that has been a fixed portion.

As an example of further re-fixing, it will be assumed that the film member 85 in a zonal shape is mounted on the same side as the one end 5*c* of the substrate 5 so as to link the periphery of the fixing portion 7 on the left side of the substrate 5 and the periphery of the fixing portion 7 on the right side of the substrate 5, for example. After the film member 85 has been removed by cutting or scraping along the borders described above, further re-fixing can be performed as described below. For example, another re-fixed portion 920 to be used for further re-fixing may be provided at a position reflecting parallel translation toward one of the one end 5*c* and other end 5*d* of the substrate 5 with respect to the current re-fixed portion 920. Since the film member 85 on the portion of the current re-fixed portion 920, the portion being enclosed by the borders, is removed, another re-fixed portion 920 to be used for further re-fixing may be provided at the position at which the other re-fixed portion 920 is overlaid on the current re-fixed portion 920. Thus, both the substrate 5 and the fixing portion 7 can be repeatedly reused in further re-fixing.

The position at which the re-fixed portion 920 is re-fixed and the number of re-fixed portions 920 are not limited to the above description. When, for example, the rib 78 is preserved without being damaged, re-fixing and positioning between the substrate 5 and the fixing portion 7 can be performed by fitting between the cutout 55 and the rib 78. In this case, it is only necessary to re-fix one re-fixed portion 920 on the same side as the one end 5*c* of the substrate 5 with the film member 85. The re-fixed portion 920, which is a portion that has been re-fixed, only needs to be in the non-terminal portion NT. For example, the re-fixed portion 920 may be a corner or corner portion of the front surface 5*a* of the substrate 5. In this case, re-fixed portions 920 are preferably provided so as to be diagonally opposite with respect to the outside shape of the substrate 5. For example, at the left end of the one end 5*c* of the substrate 5 and the right end of the other end 5*d* of the substrate 5, the substrate 5 is re-fixed by the film member 85.

In the embodiment as well, when the surface, of the film member 85, on which to perform fusing or bonding is changed, the substrate 5 can be repeatedly attached to and removed from the fixing portion 7. That is, the substrate 5 has the re-fixed portion 920. When the substrate 5 is re-fixed to the fixing portion 7 by the fixing member 8, therefore, the print material storage container 100 can be reused. This can reduce the environmental load.

C. Third Embodiment

Figure 8:
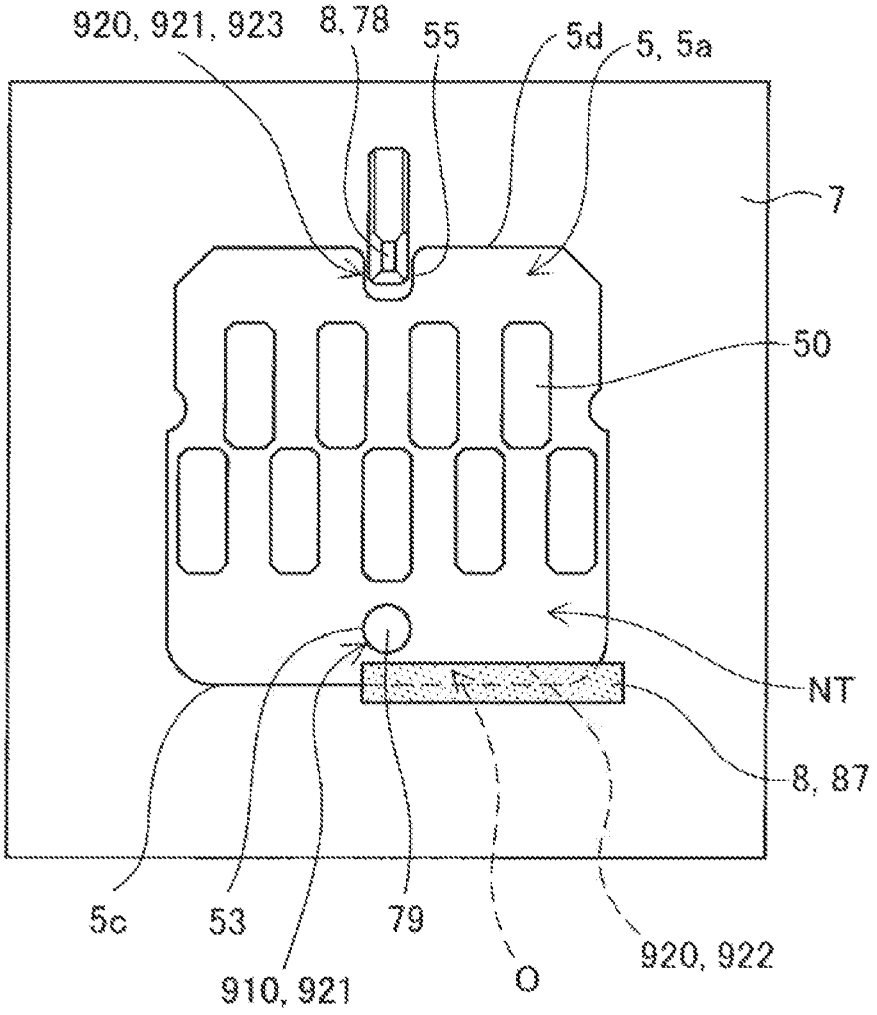
FIG. 8 s a top view illustrating a state in which, in a third embodiment, the substrate is attached to the fixing portion.
Figure 9:
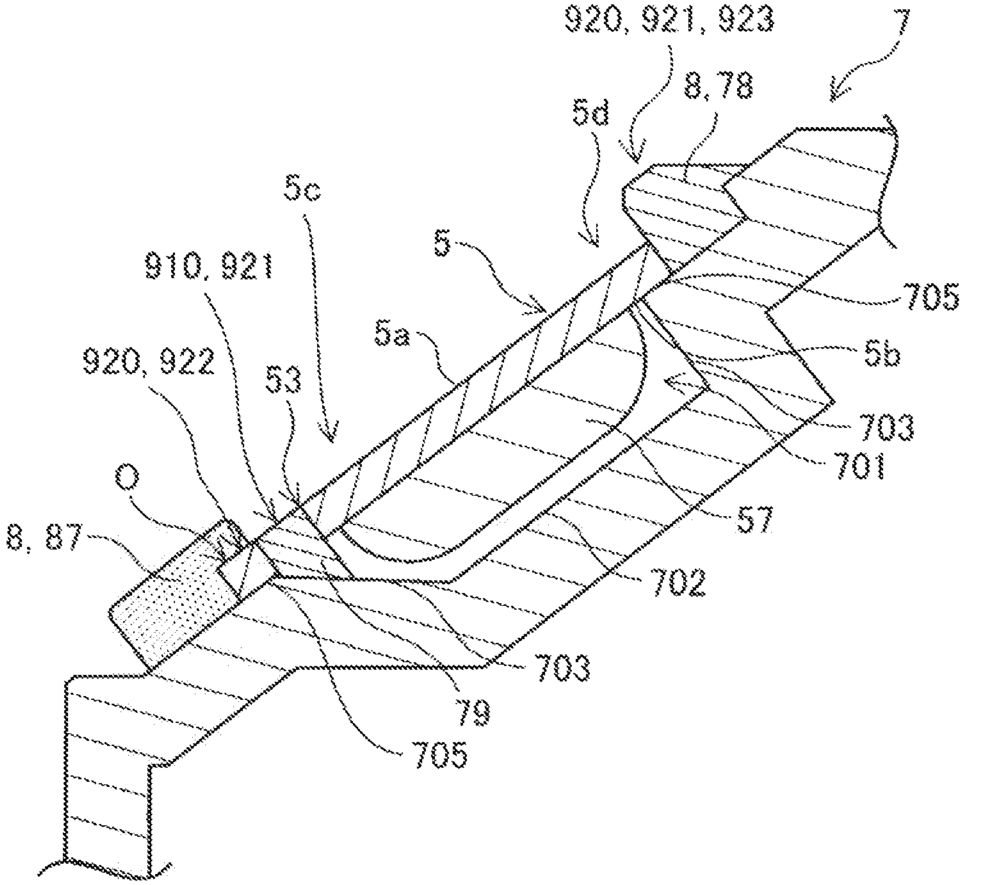
FIG. 9 schematically illustrates a cross section in a state in which the substrate is attached to the fixing portion.

FIG. 8 is a top view illustrating a state in which, in a third embodiment, the substrate 5 is attached to the fixing portion 7. FIG. 9 schematically illustrates a cross section in a state in which, in the third embodiment, the substrate 5 is attached to the fixing portion 7. In FIGS. 8 and 9, as an example, the substrate 5 is re-fixed to the fixing portion 7 by using an adhesive 87 as the fixing member 8. To prevent terminals 50 from causing an electrical problem such as a short-circuit, the adhesive 87 is preferably non-conductive. For example, a resin-based adhesive is used. In this embodiment, on the same side as the other end 5*d* of the substrate 5, the rib 78, which is used as the fixing member 8, is removed and the to-be-reused portion 923, which can be re-fixed, is then re-fixed. On the same side as the one end 5*c* of the substrate 5, at least one of the unused portion 922 and to-be-reused portion 923 is re-fixed at least one location. Positioning and re-fixing on the same side as the other end 5*d* of the substrate 5 are similar as in the first embodiment described above, so descriptions will be omitted.

An aspect of re-fixing on the same side as the one end 5*c* of the substrate 5 in this embodiment will be described below. On the same side as the other end 5*d* of the substrate 5, the cutout 55 and rib 78 are fitted to each other, that is, the substrate 5 is positioned. In this state, the adhesive 87 is applied from the same side as the front surface 5*a* of the substrate 5 so as to cover the non-terminal portion NT on the same side as the one end 5*c* of the substrate 5 and an outer circumferential edge O in the fixing portion 7 on the same side as the one end 5*c* of the substrate 5. When the adhesive 87 is, for example, a solvent volatile adhesive, which is cured due to the volatilization of the solvent included in the adhesive 87, or a moisture curable adhesive, which is cured as a result of a reaction with moisture in the air, the adhesive 87 is cured by being air-dried over a time after the application of the adhesive 87. When the adhesive 87 is an ultraviolet curable adhesive, which is cured by being illuminated by ultraviolet rays, the adhesive 87 is cured by an ultraviolet irradiation device (not illustrated). Thus, the substrate 5 is re-fixed to the fixing portion 7 by the adhesive 87 used as the fixing member 8.

The adhesive 87 is preferably applied to the same side as the front surface 5*a* of the substrate 5, rather than to the abutting portion 705 positioned on the same side as the rear surface 5*b* of the substrate 5. When the adhesive 87 is applied to the abutting portion 705, with which the substrate 5 and fixing portion 7 are in contact, and is cured for re-fixing, then, on the same side as the one end 5*c* of the substrate 5, it is raised from the fixing portion 7 by an amount equal to the thickness of the adhesive 87. This may cause a contact failure between a terminal on the apparatus-side electric connecting section and a terminal 50 on the substrate 5. When the adhesive 87 is applied to the outer circumferential edge O in the substrate 5 for re-fixing, it is preferable to apply the adhesive 87 to the same side as the front surface 5*a* of the substrate 5.

Now, an aspect in which the substrate 5 re-fixed in this embodiment is removed from the fixing portion 7 will be described together with further re-fixing between the substrate 5 and the fixing portion 7.

First, the adhesive 87 is removed by cutting or melting it. Specifically, when the adhesive 87 is thermoplastic, the temperature of the adhesive 87 is changed by heating or the like to melt the adhesive 87. Then, the substrate 5 can be removed from the fixing portion 7. When the adhesive 87 has the property that the adhesive 87 is dissolved by a particular solvent, the adhesive 87 is dissolved by using an organic solvent, such as, for example, toluene, that dissolves the adhesive 87. Then, the substrate 5 can be removed from the fixing portion 7. When the re-fixed portion 920 remains and the fixing portion 7 has a portion that can be melted, that portion of the fixing portion 7 is melted by heating or the like to melt the portion. Then, the substrate 5 can be removed from the fixing portion 7. Next, the rib 78 fitted to the cutout 55 is removed. The rib 78 may be removed by being damaged or by sliding the substrate 5 in the direction from the other end 5*d* of the substrate 5 toward the one end 5*c*. Thus, the substrate 5 is removed from the fixing portion 7. In this case, after the adhesive 87 used as the fixing member 8 has been removed, the unused portion 922 different from the previously-fixed portion 921 can be used for further re-fixing. Specifically, re-fixing may be conducted at any position, as the re-fixed portion 920, of the non-terminal portion NT in the unused portion 922.

The location at which the re-fixed portion 920 is re-fixed and the number of re-fixed portions 920 are not limited to the above description. When, for example, the rib 78 is preserved without being damaged, re-fixing and positioning between the substrate 5 and the fixing portion 7 can be performed by fitting between the cutout 55 and the rib 78. In this case, it is only necessary to re-fix one re-fixed portion 920 on the same side as the one end 5*c* of the substrate 5 with the adhesive 87. The re-fixed portion 920 only needs to be in the non-terminal portion NT. For example, the re-fixed portion 920 may be a corner or corner portion of the outer circumferential edge O of the substrate 5. In this case, re-fixed portions 920 are preferably provided so as to be diagonally opposite with respect to the outside shape of the substrate 5. For example, at the left end of the one end 5*c* of the substrate 5 and the right end of the other end 5*d* of the substrate 5, the substrate 5 is re-fixed with the adhesive 87.

In the embodiment as well, when the adhesive 87 is removed, the substrate 5 can be repeatedly attached to and removed from the fixing portion 7. That is, the substrate 5 has the re-fixed portion 920. When the substrate 5 is re-fixed to the fixing portion 7 by the fixing member 8, therefore, the print material storage container 100 can be reused. This can reduce the environmental load.

D-1. Another Embodiment 1

In the first embodiment described above, the fixing member 8 has been the pin 81, which has the shaft 81*a* inserted into the fixing hole 71 in the fixing portion 7 and also has the vertex 81*b* provided on the same side as the base end 81*s* of the shaft 81*a*, the vertex 81*b* fixing the non-terminal portion NT to the fixing portion 7, as illustrated in FIG. 5. However, this is not a limitation on the fixing member 8. The fixing member 8 may be a with-hook-portion pin 82 formed by adding a hook portion 82*a* to the pin 81, such as a split pin, a brad, a rivet or the like. Another embodiment 1 will be described below with reference to FIG. 10.

Figure 10:
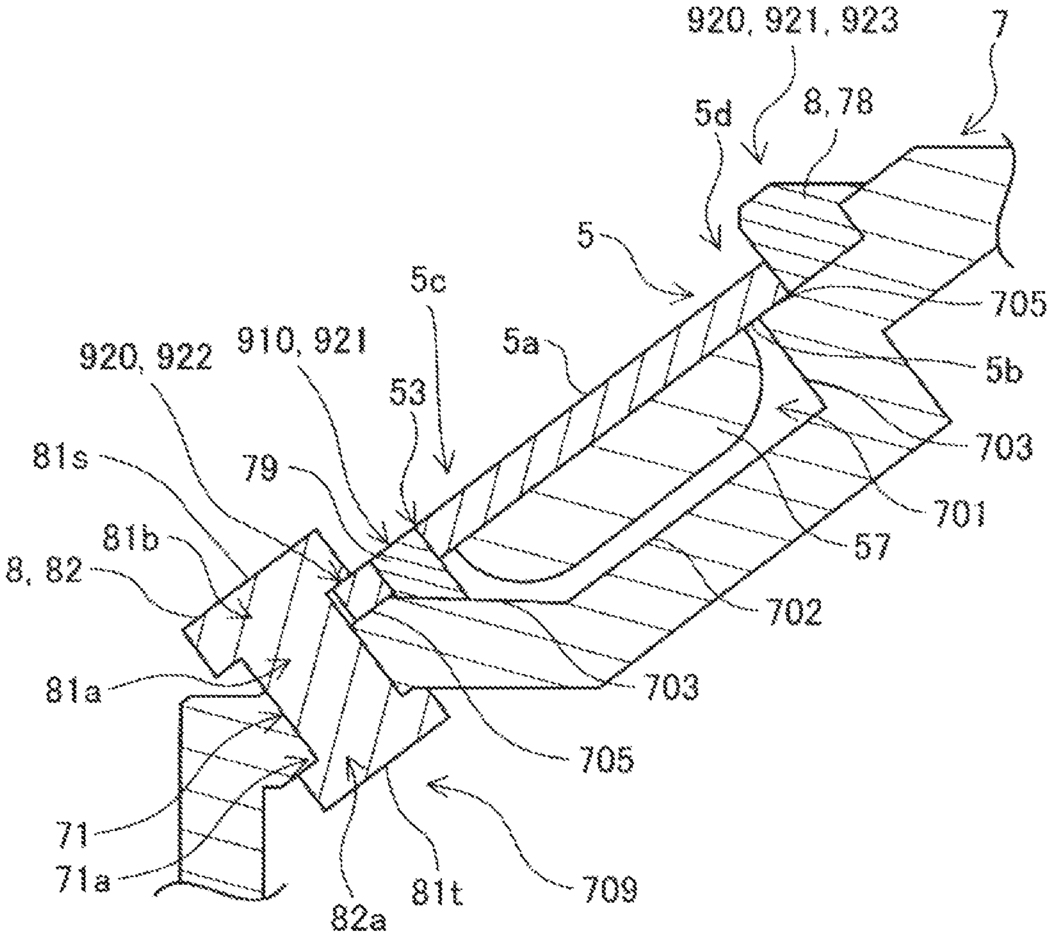
FIG. 10 schematically illustrates a cross section in a state in which, in another embodiment 1, the substrate is attached to the fixing portion.

FIG. 10 schematically illustrates a cross section in a state in which, in the other embodiment 1, the substrate 5 is attached to the fixing portion 7. Constituent elements similar to those in the print material storage container 100 illustrated in FIG. 5 will be assigned the same reference characters and descriptions will be appropriately omitted. The with-hook portion pin 82 illustrated in FIG. 10 has the hook portion 82*a* on the same side as an end 81*t* opposite to the vertex 81*b*, besides the structure of the pin 81. The end 81*t* is bent or changed in shape after insertion through the fixing hole 71 so that the outside shape of the hook portion 82*a* is larger than the fixing hole 71 in size. Now, it will be assumed that the shaft 81*a* of the with-hook-portion pin 82 is inserted into the fixing hole 71 from above the substrate 5, with the substrate 5 mounted on the fixing portion 7. Then, when the with-hook-portion pin 82 is further pressed downward with a predetermined force, the hook portion 82*a* passes through the end 71*a* of the fixing hole 71 and reaches a hollow 709. The hollow 709 referred to here is a space that is provided in a coupling member main body (not illustrated), which is included in the coupling member 130, at a lower portion of the fixing hole 71 in the insertion direction, the end 81*t* of the shaft 81*a* being accommodated in the hollow 709. Since the hook portion 82*a* is bent or changed in shape to have a larger outside shape than the fixing hole 71 in size, if a force is applied in the direction in which the with-hook-portion pin 82 is removed from the fixing hole 71 in a state in which the hook portion 82*a* has reached the hollow 709, the hook portion 82*a* becomes an obstacle. Thus, the with-hook-portion pin 82 can more strongly fix the substrate 5 to the fixing portion 7 than the pin 81.

The hook portion 82*a* is formed from an elastic member. Therefore, in the reuse of the substrate 5 and fixing portion 7 in re-fixing, the with-hook-portion pin 82 can be easily removed from the fixing portion 7 by pulling out the with-hook-portion pin 82 with a predetermined force. The hook portion 82*a* may not be formed from an elastic member. The hook portion 82*a* can be formed from a desired material. When the hook portion 82*a* is not be formed from an elastic member, the with-hook-portion pin 82 can be removed from the fixing portion 7 by, for example, cutting the hook portion 82*a* in the hollow 709.

In this aspect as well, the substrate 5 has the re-fixed portion 920. Therefore, the print material storage container 100 can be reused by re-fixing the substrate 5 to the fixing portion 7 by the fixing member 8.

D-2. Another Embodiment 2

In the first embodiment described above, the fixing member 8 has been the pin 81 as illustrated in FIG. 5. However, the fixing member 8 may be a screw instead of the pin 81. The screw has threads on the shaft 81*a* and also has a recess, into which a tool such as a screwdriver is inserted, in the vertex 81*b* to rotate the screw. In this case, the fixing hole 71 only needs to have a screw hole that engages the screw. Thus, the substrate 5 can be re-fixed to and removed from the fixing portion 7 by changing the rotational direction of the screw. In this aspect as well, the substrate 5 has the re-fixed portion 920. Therefore, the print material storage container 100 can be reused by re-fixing the substrate 5 to the fixing portion 7 by the fixing member 8.

D-3. Another Embodiment 3

The adhesive 87 has been applied to the re-fixed portion 920 in the third embodiment described above from the same side as the front surface 5*a* of the substrate 5 so that the non-terminal portion NT on the same side as the one end 5*c* of the substrate 5 and the outer circumferential edge O in the fixing portion 7 on the same side as the one end 5*c* of the substrate 5 are covered, as illustrated in FIGS. 8 and 9. Thus, the substrate 5 has been re-fixed to the fixing portion 7. However, the re-fixed portion 920 may be on the same side as the rear surface 5*b* of the substrate 5. That is, the adhesive 87 in this embodiment is the same as the adhesive 87 in the third embodiment, but this embodiment differs from the third embodiment in the position of the re-fixed portion 920. This embodiment will be described below with reference to FIG. 11.

Figure 11:
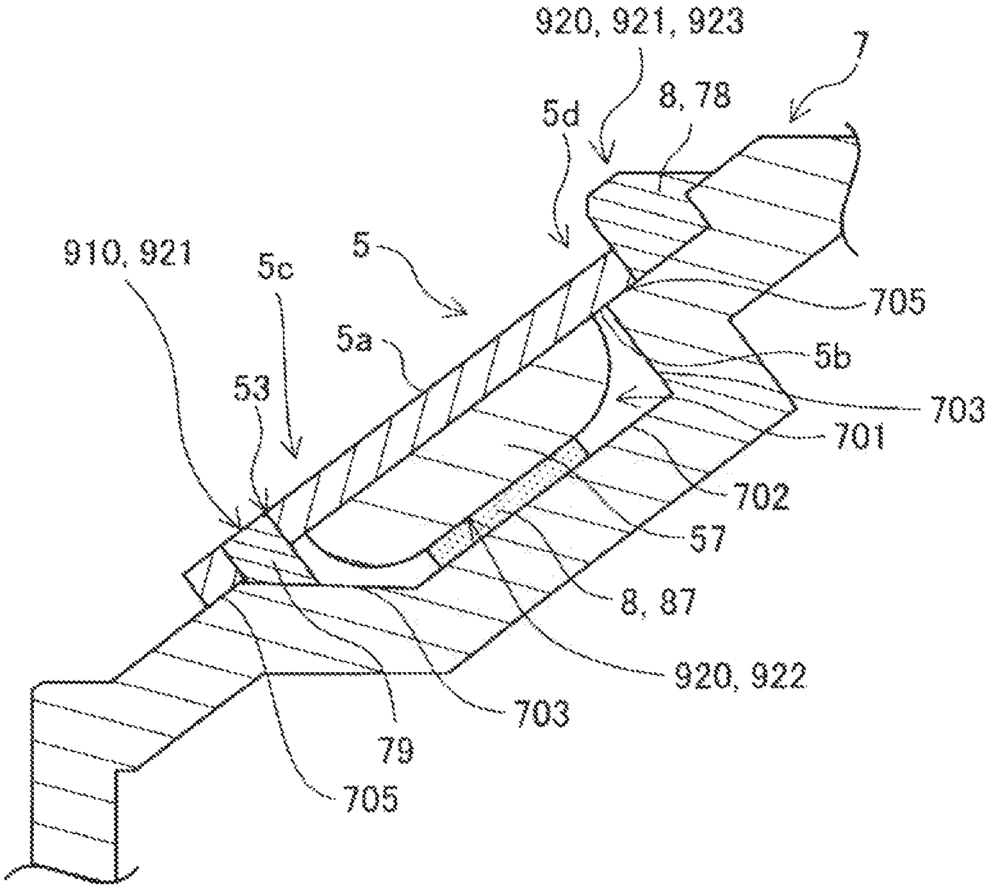
FIG. 11 schematically illustrates a cross section in a state in which, in another embodiment 3, the substrate is attached to the fixing portion.

FIG. 11 schematically illustrates a cross section in a state in which, in the other embodiment 3, the substrate 5 is attached to the fixing portion 7. Constituent elements similar to those in the print material storage container 100 illustrated in FIG. 9 will be assigned the same reference characters and descriptions will be appropriately omitted. First, the adhesive 87 is applied to the bottom 702 of the fixing portion 7. Then, the substrate 5 is slid in the direction from the one end 5*c* of the substrate 5 toward the other end 5*d* so that the cutout 55 and rib 78 are fitted to each other. In this state, the substrate 5 is mounted on the fixing portion 7. With the print material storage container 100 in this embodiment, the storage device 57 is provided on the rear surface 5*b* of the substrate 5 in a shape in which the storage device 57 protrudes. Therefore, the storage device 57 comes into contact with the adhesive 87 applied to the bottom 702 of the fixing portion 7. When the adhesive 87 is cured similarly as in the third embodiment described above, the substrate 5 is re-fixed to the fixing portion 7 with the adhesive 87 used as the fixing member 8. When the adhesive 87 that has been used for re-fixing is removed and is then reused in further re-fixing between the substrate 5 and the fixing portion 7, it is only necessary to remove the adhesive 87 similarly as in the third embodiment described above.

In this aspect as well, the substrate 5 has the re-fixed portion 920. Therefore, the print material storage container 100 can be reused by re-fixing the substrate 5 to the fixing portion 7 by the fixing member 8.

D-4. Another Embodiment 4

In the embodiments described above, the fixing portion 7 has been formed integrally with the coupling member 130 as illustrated in FIG. 1. However, the fixing portion 7 may be detachably disposed on part of a surface of the coupling member 130. In this aspect as well, the substrate 5 has the re-fixed portion 920. Therefore, when the substrate 5 is re-fixed to the fixing portion 7 by the fixing member 8, both the substrate 5 and the fixing portion 7 can be reused.

In all embodiments described above, a plurality of fixing aspects in which the substrate 5 is fixed to the fixing portion 7 are available. That is, when the substrate 5 and fixing portion 7 are reused to re-fix the substrate 5 to the fixing portion 7, a fixing aspect can be selected according to the purpose. Furthermore, in all embodiments described above, the substrate 5 includes an unused portion and a to-be-reused portion, as the re-fixed portion 920 that can be re-fixed to the fixing portion 7 by the fixing member 8. That is, when the substrate 5 and fixing portion 7 are reused to re-fix the substrate 5 to the fixing portion 7, a desired location on the re-fixed portion 920 can be selected for re-fixing. This can provide the print material storage container 100 that is highly convenient and can be reused.

It is still more preferable to use a commercially available fixing member 8 in the print material storage container 100. In this case, the fixing hole 71 only needs to be shaped so as to fit to the commercially available fixing member 8. This enables the substrate 5 to be simply attached to and removed from the fixing portion 7 without having to use a specific part as the fixing member 8.

The present disclosure is not limited to the embodiments described above. The present disclosure can be implemented in various other forms without departing from the intended scope of the present disclosure. For example, technical features, described in the embodiments, that correspond to technical features in the aspects described in SUMMARY can be appropriately replaced or combined to solve part or all of the problems described above or achieve part or all of the effects described above. When these technical features are not described in this description as being essential, the technical features can be appropriately deleted.

(1) In one aspect of the present disclosure, a print material storage container is provided. This print material storage container has: a substrate on which an electric circuit having terminals is provided; a fixing portion on which the substrate can be mounted by re-fixing; and a fixing member configured to fix a non-terminal portion without the terminal of the substrate to the fixing portion. The non-terminal portion includes a re-fixed portion, which can be re-fixed to the fixing portion by the fixing member. In this aspect, the substrate includes has the re-fixed portion. When the substrate is re-fixed to the fixing portion by the fixing member, therefore, the print material storage container can be reused.

(2) In the above aspect, the re-fixed portion may include at least one of an unused portion different from a previously-fixed portion already used for fixing the substrate to the fixing portion, and a to-be-reused portion, which can be reused by removing at least part of a previously-fixing member employed as the fixing member already used for the fixing. In this aspect, the substrate includes an unused portion and a to-be-reused portion as the re-fixed portion. Therefore, when the substrate and fixing portion are reused to re-fix the substrate to the fixing portion, many portions can be formed as candidates for re-fixing.

(3) In the above aspect, the substrate may have an initially-fixed portion, which is initially fixed by an initial fixing member, on the same side as one end of the substrate; and a portion re-fixed by the fixing member in the unused portion may be positioned on the same side as the one end. In this aspect, the unused portion on the same side as the one end of the substrate is re-fixed. When the substrate is re-fixed to the fixing portion by the fixing member, therefore, the print material storage container can be reused.

(4) In the above aspect, the initially-fixed portion may have a through-hole formed in the substrate and the periphery of the through-hole; and the initial fixing member may be inserted into the through-hole. In this aspect, when, in the initially-fixed portion, the initial fixing member provided on the fixing portion is inserted into the through-hole formed in the substrate, the substrate is initially fixed to the fixing portion. This assures superior positioning and re-fixing on the same side, on which the initially-fixed portion being positioned, as the one end of the substrate.

(5) In the above aspect, the fixing portion may have a fixing hole, into which the fixing member is inserted; and the fixing member may have a shaft inserted into the fixing hole in the fixing portion, as well as a vertex provided on the base end of the shaft, the vertex fixing the non-terminal portion to the fixing portion. In this aspect, when the fixing member is inserted into the fixing hole formed in the fixing portion, the substrate is re-fixed to the fixing portion. Therefore, when the substrate and fixing portion are reused to re-fix the substrate to the fixing portion, the fixing hole and fixing member can be reused by pulling the fixing member inserted into the fixing hole upward and taking out the fixing member to remove the fixing member from the fixing portion.

(6) In the above aspect, the fixing member may further have a hook portion on the same side as an end opposite to the vertex, the hook portion having a larger outside shape than the fixing hole in a state that the hook portion protrudes from the fixing hole. In this aspect, since the hook portion has a larger outside shape than the fixing hole, if a force is applied in a direction in which the fixing member is removed from the fixing hole, the hook portion becomes an obstacle. Thus, the substrate can be more strongly fixed to the fixing portion.

(7) In the above aspect, the fixing member may be a film member that covers the fixing portion and non-terminal portion to fix the non-terminal portion to the fixing portion. In this aspect, the fixing member can be formed from a film. Thus, when the substrate and the fixing portion are changed in portion welded or bonded with the film, the substrate can be repeatedly attached to and removed from the fixing portion.

(8) In the above aspect, the fixing member may be an adhesive; and the re-fixed portion may include at least one of the outer circumferential edge of the substrate and the rear surface of the substrate. In this aspect, an adhesive can be used as the fixing member. Thus, when the position at which the adhesive is to be applied is changed, the substrate can be repeatedly attached to and removed from the fixing portion.

All of a plurality of constituent elements in the aspects in the present disclosure described above are not essential. To solve part or all of the problems described above or achieve part or all of the effects described in this description, modification, deletion, replacement with new other constituent elements, or partial deletion of limited contents can be appropriately performed for part of the plurality of constituent elements. Also, to solve part or all of the problems described above or achieve part or all of the effects described in this description, part or all of the technical features included in one aspect in the present disclosure described above may be combined with part or all of the technical features included in another aspect in the present disclosure described above to form one independent aspect in the present disclosure.

The present disclosure can also be implemented in various aspects other than the print material storage container. For example, the present disclosure can be implemented in a method of manufacturing a printing apparatus, a method of manufacturing the print material storage container, a method of attaching and detaching the substrate in the print material storage container, and other aspects.

What is claimed is:

1. A print material storage container comprising:

a substrate on which an electric circuit having a terminal is provided, the substrate having a through hole;

a fixing portion configured so that the substrate is mounted on the fixing portion by re-fixing, the fixing portion having an initial fixing member formed thereon that, when the substrate is initially mounted on the fixing portion, the initial fixing member penetrates the through hole from a first surface of the substrate that faces the fixing portion toward a second surface of the substrate that faces away from the fixing portion; and a fixing member configured to fix a non-terminal portion without the terminal of the substrate to the fixing portion, the fixing member being positioned on the first surface of the substrate, wherein the non-terminal portion includes a re-fixed portion configured to be re-fixed to the fixing portion by the fixing member.

2. The print material storage container according to claim 1, wherein the fixing member includes an adhesive (87).

3. The print material storage container according to claim 2, wherein the adhesive is applied to a bottom of the fixing portion.

4. The print material storage container according to claim 2, wherein the adhesive is positioned on a storage device (57) of the substrate.

5. The print material storage container according to claim 2, wherein the adhesive is a solvent volatile adhesive or a moisture curable adhesive.

6. The print material storage container according to claim 2, wherein the adhesive is an ultraviolet curable adhesive.

7. The print material storage container according to claim 1, wherein a rib (78) is disposed on the fixing portion and the substrate has a cutout (55) that is fitted to the rib in a state where the substrate is re-fixed to the fixing portion.

8. The print material storage container according to claim 1, wherein the initial fixing member includes a protrusion, at least a leading end portion of the protrusion is removed by cutting or shaving in a state where the fixing portion is reused.

9. The print material storage container according to claim 8, wherein the fixing member different from the protrusion is used in a second or subsequent fixing.

* * * * *